United States Patent [19]

Lorenz et al.

[11] Patent Number: 5,344,562

[45] Date of Patent: Sep. 6, 1994

[54] BIOLOGICAL DEPHOSPHATIZATION AND (DE)NITRIFICATION

[76] Inventors: Gunter Lorenz, Am Rehlingsbach 25, W6382 Friedrichsdorf; Jurgen Lorenz, Mozartweg 11, D-6804 Ilvesheim, both of Fed. Rep. of Germany

[21] Appl. No.: 25,946

[22] Filed: Mar. 3, 1993

Related U.S. Application Data

[60] Division of Ser. No. 829,463, Jan. 31, 1992, Pat. No. 5,252,214, which is a continuation-in-part of Ser. No. 686,424, Apr. 16, 1991, abandoned, which is a continuation of Ser. No. 399,516, Aug. 28, 1989, abandoned.

[30] Foreign Application Priority Data

Feb. 27, 1987 [DE] Fed. Rep. of Germany ....... 3706405

[51] Int. Cl.$^5$ ............................................. C02F 3/12
[52] U.S. Cl. ................................. 210/607; 210/621; 210/624; 210/903; 210/906
[58] Field of Search ............... 210/605, 607, 614, 620, 210/621, 623, 624, 625, 626, 903, 906

[56] References Cited

U.S. PATENT DOCUMENTS

| | | |
|---|---|---|
| 3,259,566 | 7/1966 | Torpey . |
| 3,654,147 | 3/1971 | Levin et al. . |
| 3,953,327 | 4/1976 | Parker . |
| 4,056,465 | 11/1977 | Spector . |
| 4,141,822 | 2/1979 | Levin et al. . |
| 4,173,531 | 11/1979 | Matsch et al. ....................... 210/903 |
| 4,183,809 | 1/1980 | Klapwijk et al. . |
| 4,183,810 | 1/1980 | Baenens et al. . |
| 4,460,470 | 7/1984 | Reimann . |
| 4,487,697 | 12/1984 | Böhnke et al. . |
| 4,488,968 | 12/1984 | Hong et al. . |
| 4,522,722 | 6/1985 | Nicholas . |
| 4,568,462 | 2/1986 | Böhnke et al. . |
| 4,624,788 | 11/1986 | Repin ................................. 210/607 |
| 4,721,569 | 1/1988 | Northrop ............................ 210/903 |
| 4,780,208 | 10/1988 | Bohnke et al. . |
| 4,885,093 | 12/1989 | Schoenberger . |
| 4,895,645 | 1/1990 | Zorich, Jr. . |
| 4,948,570 | 8/1990 | Todd et al. .......................... 210/605 |
| 4,956,094 | 9/1990 | Levin et al. . |
| 5,098,572 | 3/1992 | Faup et al. . |
| 5,137,636 | 8/1992 | Bundgaard .......................... 210/607 |

FOREIGN PATENT DOCUMENTS

| | | |
|---|---|---|
| 0019203 | 11/1980 | European Pat. Off. . |
| 3716782 | 11/0000 | Fed. Rep. of Germany . |
| 3427310 | 7/1985 | Fed. Rep. of Germany . |
| 53-89259 | 8/1978 | Japan . |
| 62-244496 | 10/1987 | Japan . |
| 1484928 | 9/1977 | United Kingdom . |

OTHER PUBLICATIONS

Text: "Biologische-Chemische und weitergehends Abwasserreinigung", 1985, Ernst & Sohn Verglag pp. 311–314.

Primary Examiner—Christopher Upton
Attorney, Agent, or Firm—Burns, Doane, Swecker & Mathis

[57] ABSTRACT

A modified activated sludge system is provided wherein wastewater is treated to reduce BOD, nitrogen, and/or phosphorus. The disclosed system features a zone sequence nitrification/denitrification, with nitrification induced by recycling mixed liquor that contains a significant concentration of oxygen and nitrifying bacteria. With a further modification, the main treatment zones of the treatment system are split into two or more parallel treatment trains that are either high-loaded with BOD or low-loaded with BOD. The high-loaded sections facilitate the sludge generation and BOD removal, while the low-loaded sections are operated for nitrification and to enhance the growth of nitrifying bacteria. The parallel treatment zones combine and pass into a final denitrification zone. Phosphorus removal is achieved with phosphate release in a reverse flow regime to the main treatment, and phosphate retention primarily in aerated treatment zones in the main stream of the process. The phosphorus is discarded from the system as sludge.

14 Claims, 1 Drawing Sheet

BIOLOGICAL DEPHOSPHATIZATION AND (DE)NITRIFICATION

This application is a divisional of application Ser. No. 07/829,463, filed Jan. 31, 1992, now U.S. Pat. No. 5,252,214 in turn a continuation-in-part of U.S. patent application Ser. No. 07/686,424, filed Apr. 16, 1991, now abandoned, in turn a continuation of U.S. patent application Ser. No. 07/399,516, filed Aug. 28, 1989, and now abandoned.

BACKGROUND OF THE INVENTION

Field of the Invention

The present invention relates to improvement in the treatment of municipal and/or industrial wastewater by an activated biomass process designed for effective removal of phosphates, nitrogen and BOD/COD from a wastewater stream.

Prior Art

Several processes were disclosed in the past regarding removal of phosphate and nitrogen from wastewater. One group of such processes is based on a denitrification stage before the main aeration stage. In order to achieve denitrification, anoxic conditions must be maintained in this stage. One form of such a system is that described by Barnard, J. L. "Water and Waste Engineering" (1974) 33, and subject of South African Patent No. 7205371. In this so-called Bardenpho process, four completely mixed activated sludge basins are operated in series followed by a clarifier in which sludge is returned to the first basin. The first and third basins are operated under anoxic conditions in order to achieve denitrification. These basins receive mixed liquor containing nitrates and nitrites from the second and fourth basins in the series which are aerated. The oxygen content of the return sludge needs to be as low as possible in order to facilitate denitrification in the first zone of the process. Thus, the return sludge characteristics prevent any nitrification in the first stage of the treatment process.

A very similar process was presented by Baenens in U.S. Pat. No. 4,183,810. The proposed zone sequence is denitrification, nitrification, denitrification and final sedimentation. Two feedback streams are admitted to the initial denitrification zone. Regarding the characteristics of the feedback streams, the same applies as with the Bardenpho process.

A process that also features denitrification prior to nitrification is described by Klapwijk in U.S. Pat. No. 4,183,809. The application of this process is advantageous to other prior art only if the ratio between the organic loading (measured in mg/l COD according to the dichromate method) and the total amount of nitrogen (rag/l) is approx. between 3 and 7 (See col. 2, line 45). Due to the design of the denitrification zone prior to nitrification, this process is only capable of removing about 80% of the influent nitrogen concentration (See col. 5, line 5–24). Furthermore, this process can not be used for phosphorus removal.

Another type of process is characterized by a anaerobic/aerobic treatment zone sequence as the main biological treatment train. Such a zone sequence, possibly with an interposed anoxic zone, facilitates phosphate removal in the main flow of the process. The purpose of the anaerobic zone is to set the bacteria under stress and cause phosphate release into the wastewater. This treatment commonly results in higher phosphate uptake in the later aerobic stage and therefore brings about phosphate removal from the wastewater treatment system. An example of such a process is the A/O process as described in U.S. Pat. No. 4,056,465 and in U.S. Pat. No. 4,522,722. A similar process, in a two-stage design, is the AB process as presented by Boehnke et al in U.S. Pat. No. 4,487,697 and U.S. Pat. No. 4,568,462. This process utilizes an initial high-loaded treatment stage followed by a second low-loaded treatment stage. The first stage is a high-loaded adsorption stage with an oxygen content close to zero. The high-loaded operation is necessary for buffering of shock loads of pollutants. A second purpose of the first stage is to crack substances in the wastewater which are difficult to decompose. Activated sludge from an intermediate clarifier is returned to the inlet of the first stage. No sludge recycling is allowed from the second stage to the inlet of the first stage. This stage does not operate strictly as a denitrification or nitrification zone. However, the stage operates facultatively anaerobic. The second stage is a low-loaded aeration stage that serves for nitrification. A clarifier after the second stage functions as a denitrification stage.

Both processes are characterized by recycling anaerobic sludge to the anaerobic stage.

The A/O process achieves phosphate release in anaerobic fully mixed basin with detention times in the order of 1.5 hours.

Another similar process is disclosed in Gregor [European Patent Office No. 0,019,203]. This process is designed in particular for high-loaded organic wastewater with high concentrations of organic nitrogen. The success of the invention is primarily achieved by means of a two-staged activated sludge process. The first stage is highly loaded and a portion of the inflowing wastewater is directly admitted to the second stage. The second stage is the last treatment zone. Furthermore, swim sludge from stage 1 is admitted to stage 2. Stage 2 is operated as a denitrification zone. The success of the invention is achieved at relatively high temperatures of operation [20–30° C.]. At this temperature, the nitrification efficiency of nitrifiers is higher by a factor 4–5 higher compared to typical temperatures in municipal wastewater treatment.

Another category of processes employs a denitrification stage that follows a nitrification stage [cf. ATV p. 311]. The nitrification is achieved in an aeration zone. From this aerated zone, the wastewater is discharged directly into an anoxic denitrification zone. The wastewater that is discharged from the nitrification zone typically contains a significant concentration of dissolved oxygen. This dissolved oxygen hampers the denitrification in the anoxic zone. Consequently the speed of the denitrification reaction is slow and large treatment volumes are required for sufficient total denitrification. A process of this category has been invented by Parker [U.S. Pat. No. 3,953,327]. Parker increases the denitrification volume efficiency by adding methanol or a comparable carbon reagent.

Levin [U.S. Pat. No. 3,654,147] disclosed a similar process with the following zone sequence: Nitrification, denitrification, nitrification, final sedimentation. Recycled sludge is fed into an aerated zone for nitrification. Aeration is necessary for nitrification because the recycled sludge has an insufficient oxygen content. The recycled sludge is admitted after the primary settling tank, and thus it does not use this and other vessels, tanks, etc. prior to the biological treatment stages for nitrification.

SUMMARY OF THE INVENTION

Components of the present invention can be either retrofitted or integrated in a new design of a wastewater treatment plant. Compared to designs in the prior art, the present invention requires smaller treatment volumes and less capital investment for any given performance. Furthermore, the process requires much less energy for operation. The present invention may be combined with other proprietary technology.

The present invention is characterized by a zone sequence nitrification/denitrification. Phosphorus removal is accomplished by means of anaerobic phosphate release zones in parallel to the main nitrification/denitrification train, and an aerobic treatment zone in the main train of the treatment process. The flow in the anaerobic phosphate release zones is in the opposite direction to the main treatment. The design of the treatment plant to enhance phosphorus removal is not required for the proper functioning of the other features of this invention.

The processes known in the art are characterized by large tank sizes in order to achieve sufficient nitrification. The present invention provides for high degrees of removal efficiency for nitrogen, phosporus, and BOD/COD simultaneously with reduced treatment volumes. One means to achieve the desired objective is to enhance the conditions for growing nitrifiers. Nitrifiers grow at a much slower rate than other bacteria in the biomass. The earlier nitrifiers can be generated in a treatment process, the better the efficiency in the nitrification zones and the smaller the required treatment volume. In the present invention, early generation of nitrifiers is achieved by recycling mixed liquor that contains nitrifiers and oxygen into a zone close to the wastewater inlet. Thus, nitrification, BOD removal, and the decomposition of difficult-to-decompose substances takes place prior to the first biological treatment zone. A considerable amount of nitrogen is removed prior to entering the main biological treatment zones.

A second feature of the invention is the treatment of the wastewater stream in two parallel zones. The wastewater stream is split into one stream that flows into a high-loaded zone and one stream that passes a low-loaded treatment zone. The low-loaded zone is operated under conditions that favor the growth of slowly growing bacteria nitrifiers, acinobacter, etc.]. The high-loaded zone is preferably operated as an aerobic zone. In this zone sludge retains phosphorus and is withdrawn from the system. One or more of the following goals may be accomplished by means of operating the high-loaded zone:

High-loaded operation fosters the growth of fast growing bacteria, e.g. chemoorganothropic bacteria. Thus, sludge generation is increased.

Increased energy efficiency by means of higher sludge loading due to reduced aeration requirements. Adjustable and effective BOD removal through withdrawal of sedimentated sludge.

Increased phosphate retention through increased aeration. This mode of operation is also associated with higher sludge age than other modes.

In addition, separation of the sludge recycling system of each of the parallel units further improves the conditions for growth of certain microorganisms.

Phosphorus removal is an additional feature that advantageously may be integrated into the treatment system. All steps regarding phosporus removal as described herein are optional and are not required for the advantageous operation of the other features of this invention. The phosphate release takes place in one or several anaerobic zones (20, 20a, 20b) parallel to the main treatment stages (2). The flow is the reverse of the flow in the main treatment stages (2). The phosphate release zone may consist of any number of interconnected chambers.

Due to the biological activation of the pretreatment zones and due to the parallel treatment in high-loaded and low-loaded zones, the possible sludge loadings of the treatment areas are higher than with any other comparable biological nutrient removal (BNR) process. Thus, treatment volumes can be smaller. The typical sludge loading of a wastewater treatment plant according to this invention is on average between 0.05 and 0.5 kg $BOD_5$/kg sludge*day higher than the typical sludge loading of other biological nutrient removal processes. The exact loading differential depends on the wastewater characteristics. The parallel treatment in high-loaded and low-loaded zone sequences is particularly advantageous, because most of the $BOD_5$ can flow through the high-loaded zone, while in the low-loaded zone slowly growing bacteria can proliferate.

The operation of an activated biomass process with the present invention will be understood and its advantages further appreciated from the detailed description that follows read in conjunction with the accompanying drawing.

DETAILED DESCRIPTION OF THE INVENTION

Definitions

Figure 1:
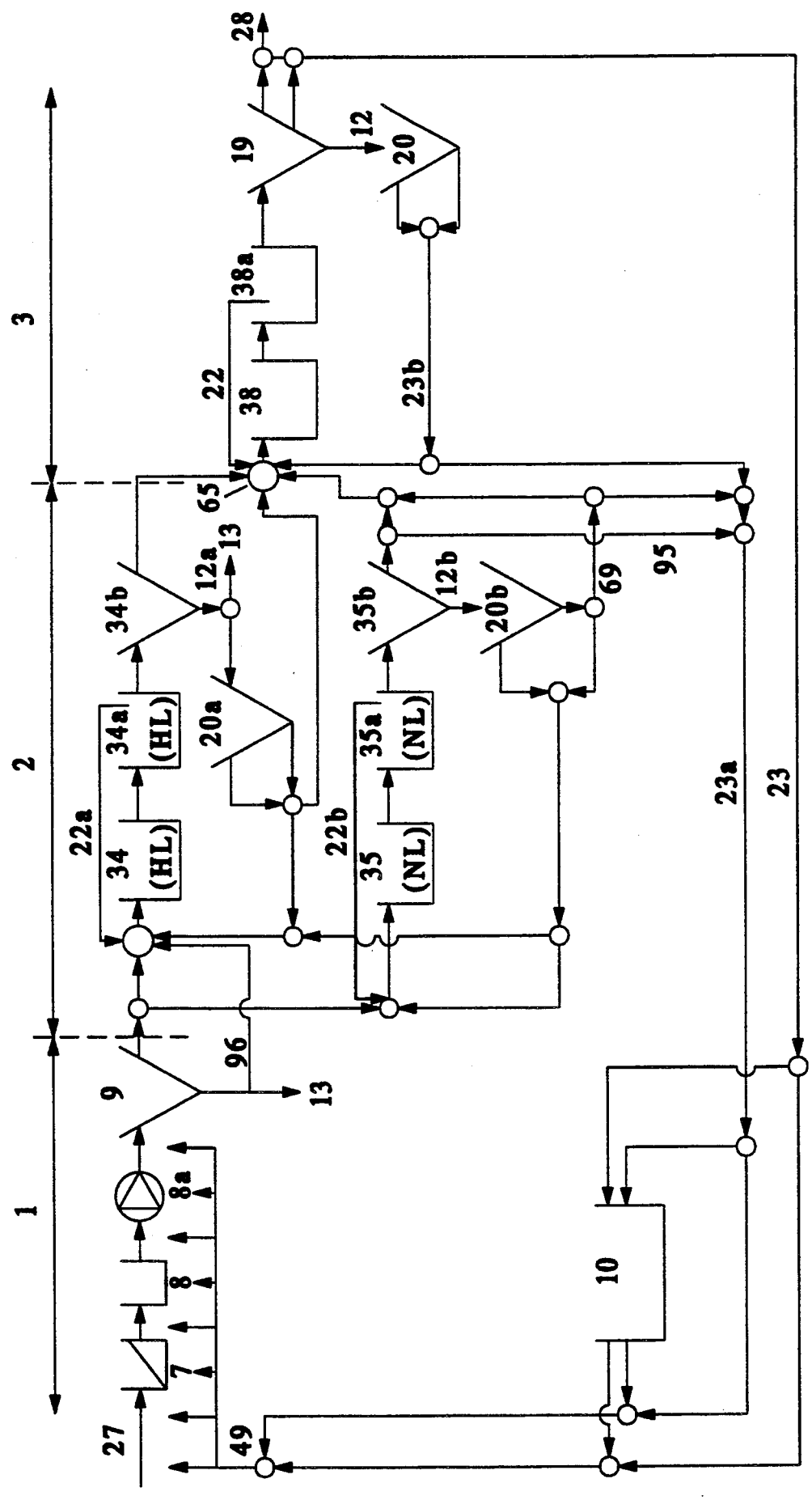
FIG. 1 is a schematic side view of the simplified system for the practice of the invention. Arrows indicate flow direction.

For the purposes of this invention COD and BOD are referred to as BOD.

High-loaded, Low-Loaded: For purpose of the present patent application, "high-loaded" or "low-loaded" refers to the loading of zones in terms of BOD. The terms "high-loaded" and "low-loaded" are used to describe the BOD loading relative to each other. Loading is always defined as kg $BOD_5$ per kg dry sludge and day. The typical loading of a high-loaded zone is more than 0.5 kg $BOD_5/m^3d$. The typical loading of a low-loaded zone is 0.03 to 0.3 kg $BOD_5/m^3d$.

Anaerobic: Zones substantially free of $NO_x^-$ (i.e. less than 0.3 mg/L expressed as elemental nitrogen) and substantially free of dissolved oxygen (i.e. typically less than 0.7 mg/L).

Anoxic: BOD is metabolized by nitrates and/or nitrites in initial total concentrations of more than 0.5 mg/L expressed as elemental nitrogen. Dissolved oxygen is maintained at typically less than 0.7 mg/L.

Nitrifiers: Microorganisms that are required for or foster nitrification, e.g. nitrosomas and nitrobacter.

High Concentration of Nitrates: Typically more than 20 mg/L in $NO_x^-$ in municipal treatment with influent concentrations of 50 to 60 mg/L $NO_x^-$.

Low Concentration of Nitrates: Typically between 2 and 20 mg/L in $NO_x^-$ in municipal treatment with influent concentrations of 50 to 60 mg/L $NO_x^-$.

High Concentration of Phosphates: This is a relative term, depending on the concentration in influent vs. effluent. For the purposes of this invention, a high concentration in phosphates refers to a value between wastewater influent and effluent concentrations of phosphate.

Mixed Liquor: Mixture of wastewater with a suspension of microorganisms.

DETAILED DESCRIPTION OF DRAWING AND BEST MODE OF OPERATION

The invention provides for recycling a portion of treated wastewater back to a pretreatment stage. This encourages the nitrification of the wastewater prior to the biological treatment stage, resulting in greater efficiency of nitrogen removal, and substantial smaller treatment volume.

Heretofore, recycle of mixed liquor to a pretreatment stage was not believed to produce any beneficial results with respect to nitrification. Hence, the result obtained by practice of the invention was unexpected.

In another embodiment, the invention provides for parallel wastewater streams. The separation of the wastewater streams in this manner allows one stream to have a low load, i.e. low $BOD_5$, which encourages growth of nitrifying bacteria. The other stream has a high load, which encourages the growth of fast-growing bacteria, e.g. chemoorganothropic bacteria, and associated with it fast sludge generation. This withdrawal of this sludge results in $BOD_5$ and phosporus removal.

FIG. 1 shows the main sections of a wastewater treatment process according to the present invention. Section 1 is a typical pretreatment stage of a municipal wastewater treatment plant, and is followed by the main biological treatment area (2). Sludge and/or mixed liquor (23a) from the main biological treatment area is returned for activation of the pretreatment area (1). After passing through the main biological treatment area, the mixed liquor flows into the final sedimentation stage (3). The functions of the final treatment area (3) are denitrification and optionally final purification. A water sludge mixture (23) from the final sedimentation zone (19) may be fed back to the pretreatment area. The treated wastewater is discharged (28) into the receiving waters.

The pretreatment area (1) as shown in FIG. 1 details the typical train of a municipal wastewater treatment plant and is shown to provide a better understanding of the biological activation of this area. The biological activation ensures nitrification of the incoming wastewater as early in the process as possible. In accordance with this invention, the purpose of the biological activation is nitrification, BOD removal, and the decomposition of difficult-to-decompose substances. Specifically, phosphate release in the presedimentation area (1) is neither desired nor accomplished with the biological activation (23,23a) as described in the present invention.

The following description typifies the train of a pretreatment area of a municipal wastewater treatment plant: After the inlet area (27) the wastewater passes through a rake (7), an aerated or not aerated grit and grease removal stage (8), a pumping unit (8a), and a presedimentation tank (9). The nitrification resulting from the activation according to this invention will be further improved if the grit and grease removal is designed with an integrated aeration unit, as known in the art. While none of these units in this or any other sequence is required for the operation of this invention, each of these units and any conduit between them may be utilized for biological activation. For the purpose of this invention, any component that preceeds the main biological treatment stages and that fulfills similar functions as the before-mentioned units will be considered part of the pretreatment stage (1).

Recycled mixed liquor (23,23a) for biological activation of primary treatment area (1) may be admixed to the inflowing wastewater stream at any point before or after the wastewater intake (27), and before or after any settling device (9). If a primary treatment area (1) is missing, the recycled mixed liquor (23,23a) may be admitted directly to the main biological treatment zone (2). In order to get best results, the recycled mixed liquor (23,23a) should be admixed before the wastewater intake (27). The recycled mixed liquor (23,23a) contains a high concentration of oxygen (more than 0.5 mg/L) and a high concentration of slowly growing bacteria, e.g. nitrifiers. The concentration of nitrifiers needs to be at least high enough to maintain a large enough population until reaching the final sedimentation zone (3). The recycled mixed liquor (23,23a) may be admitted through only one outlet or through several outlets as indicated in FIG. 1.

Settling zone (9) may or may not be part of a presedimentation tank (not shown), and is not operated anaerobically. The sludge retention time in settling zone (9) is determined by the sludge settling characteristics. The typical sludge retention time is 0.5 to 5 hours. A portion of the primary sludge withdrawn from (9) may be admixed to a high-loaded zone (34), passing line (96). The primary sludge has been converted through metabolism into a biomass with a BOD loading that is more easily biodegradable than the original BOD. The remainder of the primary sludge is withdrawn from the system for digestion (13). Settling zone (9) is advantageous for the operation of the present invention for the following reasons:

$BOD_5$ removal in the mixed liquor is typically 20%. Thus, $BOD_5$ content is reduced before entering the main treatment stages (2).

$BOD_5$ separation: The $BOD_5$ contained in the sludge of the incoming wastewater settles in sedimentation zone (9) and can be withdrawn from the wastewater treatment system for digestion (13). Thus, $BOD_5$ removal in addition to the $BOD_5$ removal in the mixed liquor of up to 40% can be achieved by a typical municipal wastewater treatment plant.

$BOD_5$ transfer: 0% to 100% of the primary sludge from (9) may be transferred through line (96) into the high-loaded aerobic treatment zone (34), while the balance is withdrawn for digestion (13). In doing so, the $BOD_5$ loading in (34) is increased, providing more food for the generation of bacteria. This in turn increases the phosphate retention in (34, 34a). In addition, the increase in $BOD_5$ is beneficial to the denitrification at a later point in the treatment process (38, 38a): In treatment zones (38, 38a) no additional carbon sources such as methanol are required for denitrification. The amount of primary sludge transferred via line (96) is limited to the amount required for later phosphorus elimination and denitrification.

After the settling tank (9), the wastewater flows into the main biological stages [2], also referred to as nitrification and aerobic stages. In the simplest design, [2] consists of one tank that can be operated to achieve nitrification. Alternatively, [2] may be substituted by any other known method of the prior art that achieves nitrification and/or carbon removal.

The nitrification and aerobic stages (2) are the main treatment stages of a generic wastewater treatment plant according to an activated sludge design. Stages (2), in accordance with one embodiment in this invention, may consist of a tank or sequence of tanks that are operated under low-loaded conditions to achieve nitrification, wherein a water/sludge mixture is recycled from one tank to a preceeding tank. This recycle stream results in a significant increase in nitrification as proven in empirical testing. After the low-loaded zone and before the final treatment zone, a settling zone is interposed.

A preferred way of operation as part of this invention is delineated in FIG. 1.

In a preferred embodiment, the treatment zones (2) contain at least two parallel zone sequences (34, 34a, 34b) and (35, 35a). Zones (34, 34a, 35, 35a) are the main biological treatment zones. Zone sequence (34, 34a, 34b) is operated under high-loaded conditions. Zone sequence (35, 35a) is operated under low-loaded conditions. Zone (34b) functions as a sedimentation zone and may be designed as any type of settling device. Mixed liquor (22a) is recycled from (34a) to the inlet of (34) for biological activation. Similarly, mixed liquor (22b) is recycled from (35a) to (35).

The purpose of the high-loaded zone is to maintain conditions that are favorable for the growth of the fast-growing chemoorganothropic bacteria. More growth of chemoorganothropic bacteria means higher sludge generation. The sludge extracts BOD and phosphorus from the mixed liquor. By withdrawing sludge from the system from settler (34b) for digestion (13), BOD and phosphorus is removed from the wastewater. Furthermore, by controlling the sludge loading in the high-loaded zones, it can be ensured that enough BOD is available for denitrification and final purification in zones (38, 38a).

The purpose of the low-loaded zone is the proliferation of slowly growing bacteria, in particular nitrifiers and acinobacters. The sludge loading must be low enough at all times to ensure sufficient proliferation of these slowly growing microorganism.

The overall retention time in the high-loaded zone is typically much lower than in the low-loaded zone. At a maximum, the retention time in the high-loaded zone is equal to the retention time in the low-loaded zone.

A settling device (35b), e.g. a clarifier, might be connected after zone (35a), depending on operating conditions. It is understood, that each of the sequences (34, 34a, 34b) and (35, 35a, 35b) may be split into any number of parallel trains. Such design is helpful to control the loading in the respective treatment zones.

There are no connecting lines between the parallel treatment zones. Each of the treatment zones (34, 34a, 34b, 35, 35a, 35b) may be partitioned into several units that are connected in series without backmixing. Also, some of the parallel zones may be operated as contingency zones to provide additional treatment volume for times of peak influent flow or loading.

Table 1 shows the ratio of volume flows of the effluent from the settling device (9) into the high-loaded and low-loaded zones.

TABLE 1

| Zones | Typical | Range ("Start-up" to "Stationary") |
| --- | --- | --- |
| Low-loaded (35,35a) | 70% | 5 to 95% |
| High-loaded (34,34a) | 30% | 95 to 5% |

In stationary operation, the typical split of the effluent from settling device (9) between high-loaded and low-loaded zone sequences is 70% of volume into the low-loaded treatment area, and 30% of volume into the high-loaded treatment area. The $BOD_5$ loading of the high-loaded zone is higher than that of the low-loaded zone because of the transfer of primary sludge via line (96). In the start-up phase of the operation, the portion of the wastewater flow volume from the settling device (9) into the low-loaded zone is much lower than under stationary operation. At a minimum, this portion may be only 5% of the total volume flow.

In stationary operation, and under favorable operating conditions, as much as 95% of the volume flow might pass the low-loaded zones (35,35a).

The treatment volumes are reciprocals of the split of the flow of mixed liquor: For instance, the typical treatment volume of the low-loaded treatment area is 2.3 times as large as the treatment volume of the high-loaded treatment area.

In a specific application of the invention it proved beneficial to split the low-loaded zone sequence (35, 35a, 35b) into three parallel trains, while the high-loaded train was not split into multiple parallel flows. Each of the parallel low-loaded trains consisted of separated tanks resembling the sequence (35, 35a, 35b). The low-loaded flow was split before zones (35) and combined after the final settling tanks (35b). This arrangement proved well suited for the Initial phase of operation of a newly constructed wastewater treatment plant. In this initial phase, all three zones are in operation to reduce the loading in the low-loaded area further than would be possible with only one train. Thus, nitrifiers have enough time to grow and build up a population large enough to satisfy the nitrification requirements. After operating the plant for two or three weeks, two of the three parallel low-loaded zone sequences may be shut down, increasing the load in the remaining low-loaded sequence, but still maintaining a large enough population of nitrifiers.

In the preferred configuration, the first partitioned zone (34 or 35) would be equipped with a mechanical mixer or other aerating device. The final partitioned zones of (34a, 35a) are also equipped with mechanical mixers. Each of the zones (34, 34a, 35, 35a) are preferably equipped with bubble aerators that can be switched off. The sedimented sludge from clarifier (34b) has a high phosphorus content. Extracting this activated sludge (13) from the wastewater treatment system permits phosphorus to be discarded from the system. Extracted sludge (13) may be fed into digestors for sludge treatment. While not limited thereto, concentration of the sludge is preferably accomplished by trommel revolving screens or decanting centrifuges (not shown). Thus, phosphate release and BOD release is avoided in the concentration process. The remainder of the sedimented sludge from (34b) is recycled to the inlet of zone (34).

The sedimented sludge from clarifier (35b) is kept within the system to make best use of the generated nitrifiers. A portion of it is fed back to the inlet of zone (35), while the remainder is fed into sludge recycle line (23a). A zone (20b) might be interposed before splitting sludge stream (12b) for sludge storage and/or phosphate release. Zone (20b) functions as sludge buffer and/or phosphate release section. Sludge may be held in the recycle path for several days or more as a reserve for high-load operating conditions such as rainy weather.

For applications in municipal wastewater treatment, the following loadings are typical within the main biological stages (2): The typical sludge loading in the high-loaded zone sequence (34,34a) is 0.5 to 2.5 kg $BOD_5$/kg*d. The typical sludge age in zones (34,34a) is less than 6 days. The typical sludge loading for the low-loaded sequence (35,35a) is 0.05 to 0.5 kg $BOD_5$/kg*d.

The sludge buffers (20, 20a, 20b) might be interconnected for controlled exchange of sludge streams.

Mixed liquor from the upper zones of clarifiers (34b, 35b) combine with a portion of the settled sludge from the same clarifiers before passing jointly into the denitrification stage (38, 38a).

The sedimented sludge from clarifier (19) is kept within the system to make best use of the generated nitrifiers and other slowly growing bacteria.

As a final treatment area, a sequence (38,38a,19) follows. The primary purpose of zones (38,38a) is denitrification. A secondary function is supplementary elimination of nitrogen and other pollutants. Each of the treatment zones (38, 38a) may be partitioned into several units that are connected in series without backmixing, such as cascades. Zone sequence (38, 38a) is not required if denitrification is achieved otherwise or if denitrification is not required for achieving the desired pollution concentrations in the effluent. In zone (19), the dissolved oxygen concentration needs to be high enough to avoid phosphate redissolution from the sludge into the mixed liquor. The required oxygen content depends on the BOD loading of the zone sequence [38,38a]. The typical sludge loading is 0.03 to 0.15 kg $BOD_5$/kg*d. A preferred embodiment has an initial denitrification zone (38) followed by a nitrification zone (38a). Zone (38) is operated anoxically to achieve denitrification. To zone (38a), additional oxygen may be admitted, e.g. via bubble aeration or alternating aeration, to avoid phosphorus release in settler (19), and to achieve supplementary nitrification.

Optionally, mixed liquor (22) from (38a) may be recycled to (38). Supernatant from (38a) passes into the final sedimentation unit (19). A portion of the sedimented sludge from this zone (19) is fed to denitrification zone (38) via line (23b). The remainder is admixed to the return sludge of the main biological stages and recycled into line (23a). The ratio of the two flows can be anywhere between 0 and 1, depending on operating conditions.

Swim sludge (95) might be withdrawn from any level of settling zone (35b) and admitted into the recycle conduit (23a).

Mixed liquor, swim sludge, and/or supernatant is withdrawn from the final settling device (19) and fed into the recycle line (23). In addition, wastewater effluent (28) may be admixed to the recycle stream.

The process according to this invention can accomplish phosphorus removal without any additional tankages or lines. As known in the art, biological phosphorus removal is accomplished in an anaerobic/aerobic sequence. In the anaerobic zone, phosphate is released from certain bacteria. The bacteria are under anaerobic stress and release phosphate [ATP>ADP]. This treatment facilitates enhanced phosphorus uptake in a following aerobic zone. As part of this invention, additional tankages, lines, and equipment might be applied to improve phosphorus removal, as detailed below. However, none of these modifications are required for the other features of this invention to function properly.

Phosphate release is improved if the return sludge systems are kept separate. Best results have been achieved with a phosphate release tank (20b) for the return sludge from settlement area (35b), and a second tank (20) for the return sludge (12) from the final sedimentation area (19). The retention time of the sludge in said zones is typically between 50 minutes and 15 hours. In order to achieve increased phosphate retention in the treatment system, water removed from any sludge thickening process (e.g. flitrate, centrate) should be admitted to any or all of the phosphate release sections. The phosphate release is controlled by the retention time in the respective section. A supplemental flocculation unit might be connected after any phosphate release zone. With an influent concentration of 7 to 10 mg/L in elemental phosphorus into the WWTP at (27), and after the treatment as described above, the typical effluent concentration at (28) ranges between 0.1 to 2 mg/L in elemental phosphorus.

Recycled sludge (12) is fed into the phosphate release section (20). This recylce stream has a high concentration of phosphate, a low concentration of nitrate, and low dissolved oxygen contents. A minimum oxygen content in sedimentation area (19) is required to avoid phosphate and BOD release from the sludge into the wastewater. To guarantee this minimum oxygen level in settler (19), aeration in the final partition of zone (38a) might be required, depending on operating conditions. The nitrate contained in recycle sludge (12) is denitrified in the upper zone of (20), because no additional oxygen is admitted into release section (20). The recycle stream (23b) may be withdrawn from any level from the release tank (20): It may be supernatant, settled sludge, or any mixed liquor between these extremes. Any portion of recycle stream (23b) may be fed back to the inlet of zone (38), while the remainder is admitted to feedback stream (23a).

Optionally, a rainwater overflow tank (10) may be operated under anaerobic conditions to achieve phosphate release. Then, all or a partial stream of recycle streams (23a,23) passes the rain overflow tank. Increased phosphate absorption occurs in the inlet pump area, the grit and grease removal area, and the presedimentation tank.

In a preferred application, feedback streams (23,23a) pass through a rainwater overflow tank (10). This treatment provides a favorable environment for the growth of nitrifiers. Typically, the feedback stream (23) is 10–100% of the volume stream of the inflowing wastewater.

The combination of recycled, sedimentated wastewater (23) and recycle sludge (23a) should be as close as possible to the point of admixture of the recycle streams with the incoming wastewater. This way of operation will minimize the reduction of dissolved oxygen from (23) due to reactions with the BOD contained in (23a).

EXAMPLE

A municipal wastewater treatment plant with a capacity of 9 MGD has been designed according to the said principles of the invention in southern Germany. Design temperature is 10° C. The flow sheet is very similar to FIG. 1. There is one low-loaded and one high-loaded treatment train constituting the main biological treatment zones (2). The incoming wastewater is split by volume, 70% flowing into the low-loaded sequence, and 30% flowing into the high-loaded sequence. Main components of the wastewater treatment plant are: Rake, aerated sand and grit removal, presedimentation tank, parallel high- and low-loaded treatment zone, and final treatment zone for denitrification. Table 2 show the design parameter of the plant (The numbers in brackets refer to FIG. 1):

TABLE 2

| (mg/l) | Plant Influent (27) | Effluent from Presedimentation Tank (9) | Effluent from Parallel Main Treatment Zone (2) | Plant Effluent (28) |
|---|---|---|---|---|
| $BOD_5$ | 273 | 137 | 21.5 | 2 |
| $N_{total}$ | 56.5 | 41 | 28 | 6.5 |
| $P_{total}$ | 10 | 6 | 2 | 1 |

Total nitrogen includes ammonia ($NH_4N$) and nitrogen oxides ($NO_x$). After the parallel treatment zones the residual ammonia concentration is 2.5 mg/l. The majority of nitrogen consists of nitrites and nitrates that will be denitrified in the final treatment stage (38,38a). The plant effluent concentration of $NH_4N$ is 0.5 mg/l vs. a plant influent concentration of 50 mg/l. The remainder of 6 mg/l in $NO_x$ is not a critical parameter in this application. The overall treatment volume capacity is only 50% of standard activated sludge systems.

We claim:

1. An activated sludge process for the reclamation of wastewater, comprising the steps of:
   (a) separating incoming wastewater into two parallel streams;
   (b) nitrifying one of said parallel streams in a first treatment zone, thereby producing a nitrified effluent;
   (c) reducing the BOD in the other parallel stream by treatment in a second parallel treatment zone for BOD removal;
   (d) providing sufficient residence time for the wastewater in said two parallel treatment zones to effect sufficient growth of said bacteria;
   (e) extracting and disposing of sludge of said second treatment zone from step (c), thereby producing a clarified waste effluent stream; and
   (f) reuniting the nitrified effluent of step (b) with the clarified effluent from step (e) for further treatment of the wastewater.

2. The method as defined in claim 1, wherein said second parallel treatment zone comprises at least two hydraulically distinct sections in concurrent liquid flow communication followed by a sedimentation zone.

3. The method as defined in claim 2, wherein a portion of the treated wastewater is recycled from one said hydraulically distinct section to a preceding hydraulically distinct section of said second treatment zone.

4. The method as defined in claim 2, wherein a portion of the sedimented sludge is withdrawn from said sedimentation zone for digestion, the remainder being recycled to the first of said hydraulically distinct sections.

5. The method as defined in claim 4, wherein at least a portion of the digested sludge is recycled to the first of said hydraulically distinct sections.

6. The method as defined in claim 2, wherein at least a portion of the sedimented sludge withdrawn from said sedimentation zone is fed into a treatment zone following said two parallel treatment zones.

7. The method as defined in claim 1, wherein said first treatment zone comprises at least two hydraulically distinct sections in concurrent liquid flow communication.

8. The method as defined in claim 7, wherein the last of said hydraulically distinct sections is followed by a sedimentation zone, and wherein a portion of the settled sludge in said sedimentation zone is recycled to one of said two parallel treatment zones, the remainder being admitted to a zone before or after said parallel treatment zones.

9. The method as defined in claim 8, wherein said portion of the settled sludge passes through a digester before recycling to one of said two parallel treatment zones.

10. The method as defined in claim 7, wherein unsettled mixed liquor is recycled from one hydraulically distinct section to a preceding hydraulically distinct section.

11. The method as defined in claim 1, wherein the level of aeration of said second parallel treatment zone is determined by the desired level of phosphorus uptake.

12. The method as defined in claim 1, wherein the incoming wastewater passes through at least one initial treatment zone before entering said parallel treatment zones.

13. The method as defined in claim 12, wherein said initial treatment zones include a sludge settlement zone, feeding at least a portion of settled sludge of said sludge settlement zone into said second parallel treatment zone of step (c).

14. The method as defined in claim 1, wherein the BOD content of said first treatment zone is less than 0.6 kg $BOD_5$/(kg dry sludge * day), and wherein the BOD content of said second parallel treatment zone is greater than 0.6 kg $BOD_5$/(kg dry sludge * day).

* * * * *